United States Patent [19]

Ahnafield

[11] Patent Number: 4,722,416
[45] Date of Patent: Feb. 2, 1988

[54] JOYSTICK VEHICLE CONTROL DEVICE

[76] Inventor: Bruce L. Ahnafield, 5465 Varna Dr., Indianapolis, Ind. 46241

[21] Appl. No.: 898,489

[22] Filed: Aug. 21, 1986

[51] Int. Cl.$^4$ .............................................. B60K 26/00
[52] U.S. Cl. ................................ 180/333; 74/471 XY
[58] Field of Search ............. 180/315, 333; 74/471 R, 74/471 XY, 491; 92/130 R

[56] References Cited

U.S. PATENT DOCUMENTS

| | | | |
|---|---|---|---|
| 2,565,293 | 8/1951 | Aydelott et al. | 318/38 |
| 2,865,223 | 10/1956 | Kope | 74/494 |
| 2,929,258 | 3/1960 | Mackway | 74/471 |
| 2,988,928 | 6/1961 | Dussemier de Fonbrune et al. | 74/471 |
| 3,022,850 | 2/1962 | Bidwell et al. | 180/77 |
| 3,089,560 | 5/1963 | Priest | 180/77 |
| 3,095,754 | 7/1963 | Mayon et al. | 74/471 |
| 3,113,490 | 12/1963 | Weaver | 92/130 R |
| 3,117,649 | 1/1964 | Parton et al. | 180/77 |
| 3,426,612 | 10/1965 | Henry-Biabaud | 74/495 |
| 3,814,199 | 6/1974 | Jones | 180/6.5 |
| 4,476,954 | 10/1984 | Johnson | 180/333 |

Primary Examiner—John J. Love
Assistant Examiner—Ross Weaver
Attorney, Agent, or Firm—Woodard, Emhardt, Naughton Moriarty & McNeit

[57] ABSTRACT

A control device and system for the operation of a motor vehicle by a single joystick device. The device and system includes a pair of hydraulic cylinders, one connected to and between the vehicle and the brake pedal and the other to and between the vehicle and the acceleration pedal, a position limiting spring located within each hydraulic cylinder, a pressure regulator for maintaining a constant feed pressure from the vehicle's own hydraulic pump, a control valve for each cylinder mounted between the feed source and each hydraulic cylinder which is responsive to input signals provided by the hand operable joystick, a double port hydraulic steering cylinder integrally connected to the steering system and fed by the same hydraulic source, the steering cylinder being regulated by a double port pressure control valve which is also responsive to the same hand operable joystick.

27 Claims, 4 Drawing Figures

JOYSTICK VEHICLE CONTROL DEVICE

FIELD OF THE INVENTION

This invention relates to a controller, and more particularly to a device for controlling a motor vehicle.

BACKGROUND OF THE INVENTION

Present vehicles designed for persons having full and unrestricted use of all of their limbs consist of a rotary operating steering wheel, a brake pedal and an acceleration pedal. Where individuals have lost full use of one or more limbs, vehicle controller modifications are often made to permit the individual to safely operate a motor vehicle. Various designs and modifications have been developed in recent years to accommodate the inability to normally control one motor vehicle device or another. For example, paraplegics unable to operate the braking and acceleration pedals of a vehicle have been provided with a hand control mounted on or near the steering wheel. The types of devices developed to aid the handicapped driver have included the use of systems sensitive to the acceleration and braking forces of the vehicle as they affect a controlled mass connected to a joystick; a plurality of actuators and interfacing electronics; electric motors; pulleys; belts; gears; and, joystick devices having "feel" to them. Each of these devices have inherent problems which make them undesirable for their intended use. For example, those devices which are purely mechanical are often too complicated and thus unreliable or are not capable of providing sufficient sensitivity or feedback. Others using complicated electronics and servomotors are also complicated as well as being expensive.

A variety of such devices are disclosed in U.S. Pat. Nos. 3,089,560, issued to Priest on May 14, 1963; 4,476,954, issued to Johnson, et al. on Oct. 16, 1984; 2,865,223, issued to Kope on Oct. 8, 1956; 3,022,850, issued to Bidwell, et al. on Feb. 27, 1962; 3,117,649, issued to Parton, et al. on Jan. 14, 1964; 3,095,754, issued to Mayon, et al. on July 2, 1963; 2,565,293, issued to Aydelott, et al. on Aug. 21, 1951; 2,988,928, issued to Dussemier de Fonbrune, et al. on June 20, 1961; 2,929,258, issued to Mackway on Mar. 22, 1960; and, 3,814,199, issued to Jones on June 4, 1974.

SUMMARY OF THE INVENTION

This invention provides an improved control device and system for the operation of a motor vehicle, the device being particularly well suited for severely handicapped individuals. One embodiment of the present invention includes a pair of hydraulic cylinders, one connected to and between the vehicle and the brake pedal and the other to and between the vehicle and the acceleration pedal, a position limiting spring located within each hydraulic cylinder, a pressure regulator for providing at a feed point a constant feed pressure from the vehicle's own hydraulic pump, a control valve for each cylinder mounted between the feed point and each hydraulic cylinder which is responsive to input signals provided by a standard hand operable joystick, a double port hydraulic steering cylinder integrally connected to the steering system and fed by the same hydraulic source, the steering cylinder being regulated by a double port pressure control valve which is also responsive to the same hand operable joystick.

It is an object of the present invention to provide an improved control device and system for a motor vehicle.

A further object of this invention is to provide an inexpensive joystick operated vehicle control device.

It is another object of this invention to provide a vehicle control device which is uncomplicated and easily maintained.

It is yet another object of the present invention to provide a joystick vehicle controller which compensates for the loss of feedback normally associated with the normal operation of a steering wheel, brake pedal and gas pedal.

It is also an object of the present invention to provide a joystick vehicle control device which can be installed utilizing a vehicle's existing hydraulic pressure source, namely the engine pump for the power steering of a vehicle.

It is another object of the present invention to provide a joystick vehicle controller which can be adapted to a vehicle but which will not prevent the normal use of the adapted vehicle.

It is still another object of the present invention to provide a joystick vehicle controller which will permit safe and reliable operation of a motor vehicle by a severely handicapped individual having only one limb.

Related objects and advantages of the present invention will become apparent from the following disclosure.

DESCRIPTION OF THE PREFERRED EMBODIMENT

Figure 1:
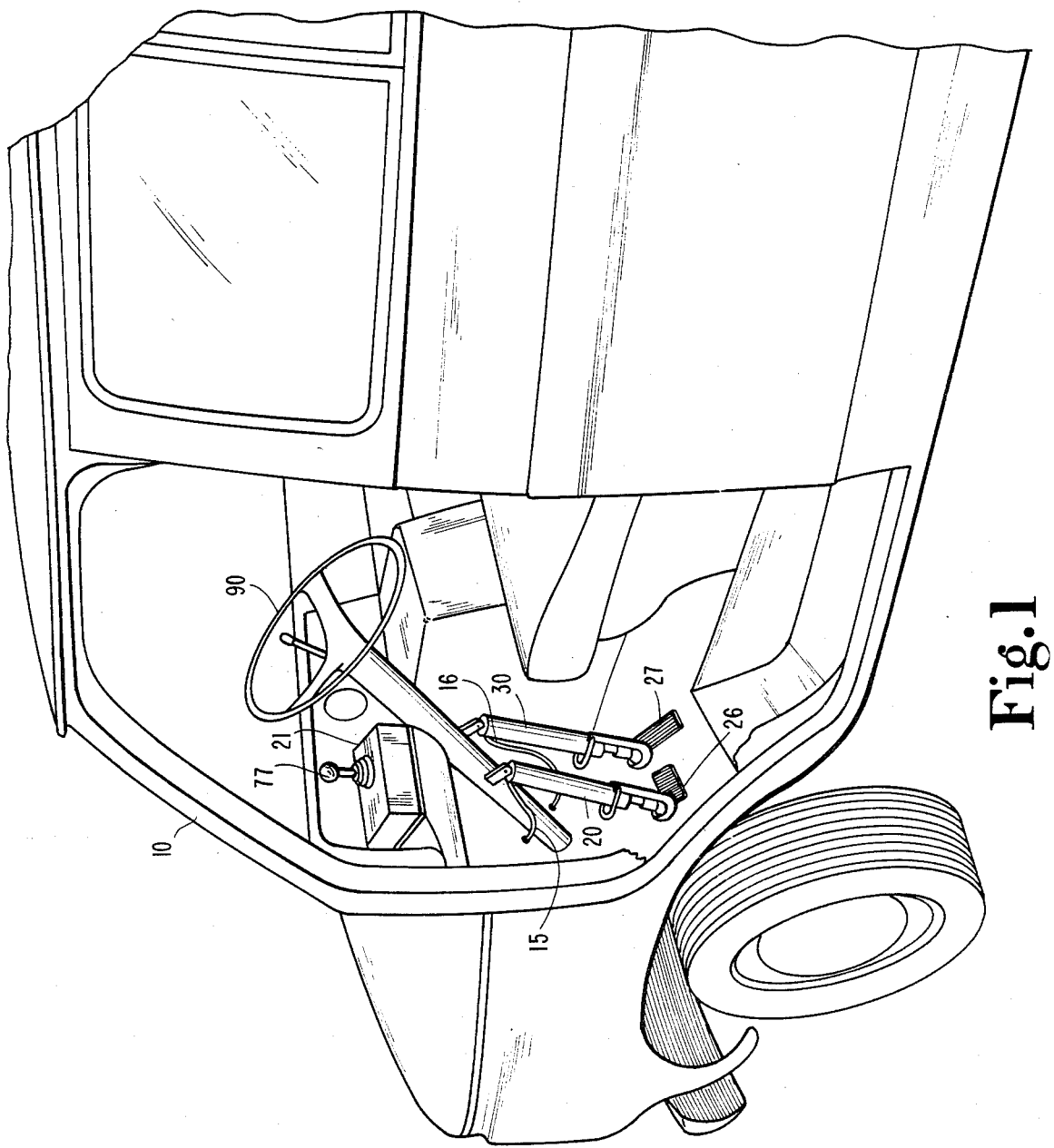
FIG. 1 is a perspective view of a motor vehicle having the vehicle control device of the present invention mounted thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
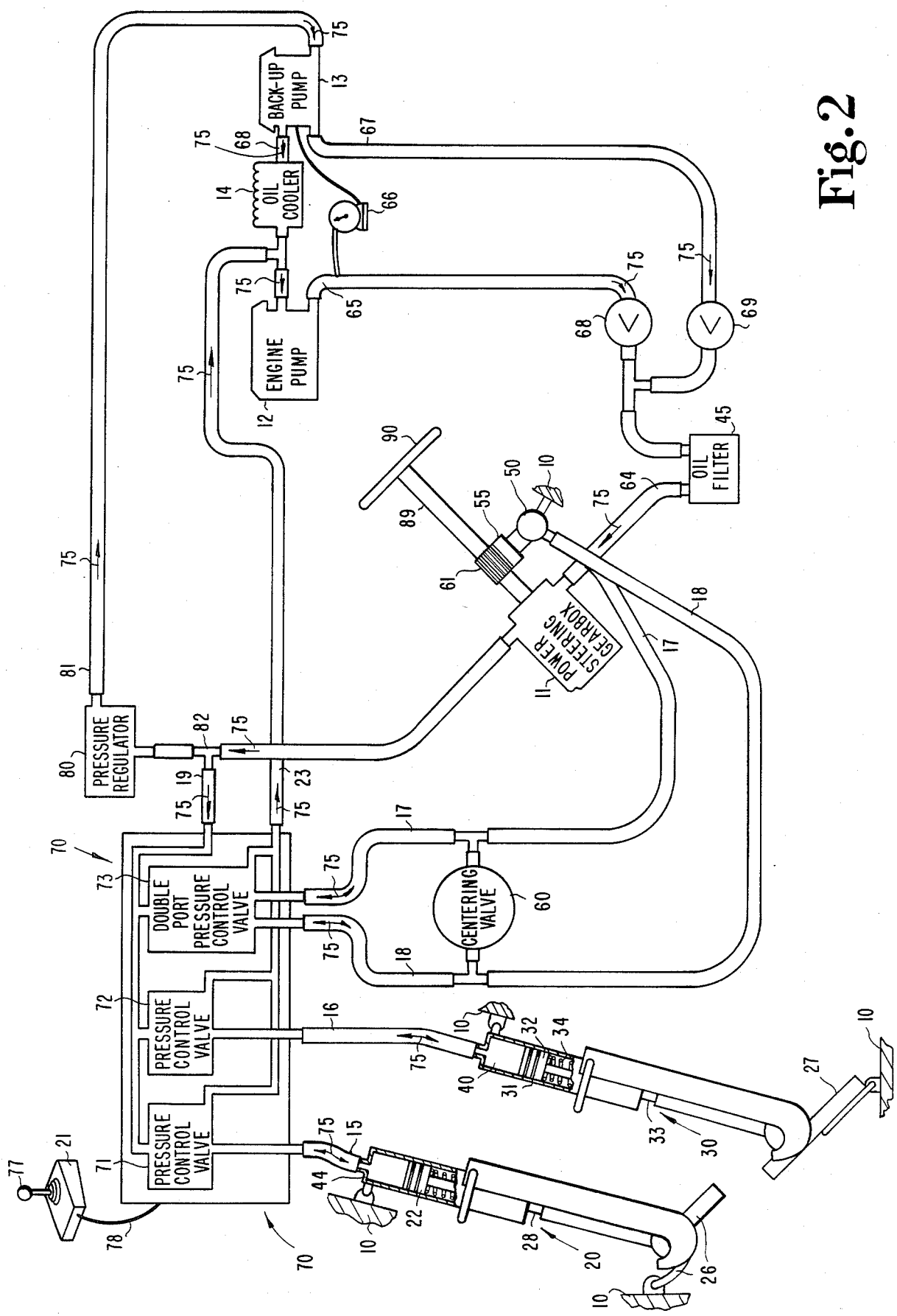
FIG. 2 is a view partially in side elevation and partially cut away and showing in diagrammatic outline the preferred embodiment of the present invention connected to the power steering system of a vehicle.

Referring now to FIGS. 1 and 2, there is shown a joystick vehicle control device integrally connected to the braking, acceleration and steering systems of a vehicle in accordance with the present invention. The vehicle, designated as 10, is a Ford Econoline Van with an E150 chassis and a 6-cylinder engine. The vehicle is also equipped with a power steering system which includes a steering gearbox 11, engine pump 12 and hydraulic lines 64, 65 and 81. The various arrows 75 indicate the direction of fluid flow within the hydraulic lines. The engine pump 12 can provide up to approximately 1600 psi of hydraulic pressure to the steering gearbox 11. Manual rotation of the steering wheel 90, which in turn rotates steering column 89, extends into the power steering gearbox 11. The output of the gearbox 11 is a pitman arm (not shown) which is connected to the remaining steering linkage and ultimately the wheels to steer the vehicle. In the event that this device is to be hooked up to a vehicle without power steering, a hydraulic pump may be used which provides hydraulic pressures at levels described herein.

Figure 3:
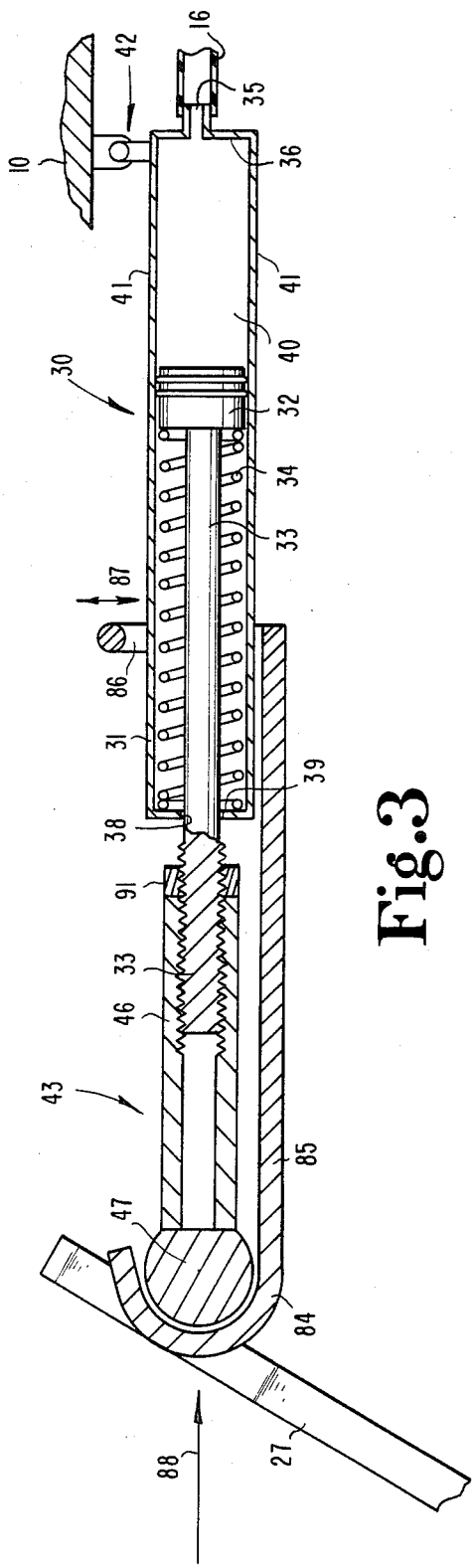
FIG. 3 is a detailed side section view of a hydraulic cylinder assembly for the braking or acceleration system in accordance with the present invention.

Power assist to the braking and acceleration systems of the vehicle is provided by hydraulic cylinder assemblies 20 and 30, respectively. Cylinder assemblies 20 and 30 are identical and will be described primarily in terms of the acceleration hydraulic cylinder 30 which is also shown in FIG. 3. Each hydraulic cylinder assembly comprises a hydraulic cylinder 31, a reciprocating piston 32, a piston rod 33 and a spring 34. The cylinder has opposite ends 36 and 39 with apertures 35 and 38, respectively. The cylinder 31 is adapted to receive hydraulic fluid through aperture 35 of the cylinder. Piston rod 33 is rigidly attached at one end to piston 32. The piston rod 33 extends exteriorly of cylinder 31 through aperture 38 with the distal end of piston rod 33 slidably and pivotally connected to acceleration pedal 27 as will later be described.

A hydraulic chamber 40 is defined by piston 32, end 36 and walls 41 of cylinder 31. An increase in hydraulic fluid pressure through line 16 and through aperture 35 into chamber 40 will produce an axial force acting upon and urging piston 32 toward end 39 and thus urging piston rod 33 outwardly through aperture 38. The input hydraulic forces are transferred through piston 32, piston rod 33 and onto acceleration pedal 27 thus simulating human forces in depressing acceleration pedal 27.

In reality, when a force acts upon an acceleration pedal, or the brake pedal of a vehicle with power brakes, the magnitude of resisting force is not great. Thus, a slight increase in hydraulic pressure to cylinder 31 would result in movement of piston 32 throughout its entire path until it reaches end 39 of the hydraulic cylinder. Human reaction and feedback would normally monitor the distance traveled by the accelerator or the brake pedal with the human brain and nervous system signaling the foot of the driver when to stop applying force to the pedal. In the present case, that feedback is provided to the driver only through the body's feelings of speed and momentum. As the bodyp's perceptions of speed and momentum and the reactions to them are usually slow and imprecise, mechanical assistance controlling the hydraulic cylinders is required. A spring 34 is mounted between the piston 32 and end 39 of cylinder 31. The spring has a constant spring rate over nearly all of its available deflection path, thus the standard formula, $F=k\cdot x$ where F equals the axial force in pounds acting on the spring, k equals the spring constant, and x equals the deflection in inches. Thus, the system approximates a nearly linear relationship between the axial force acting upon piston 32, vis-a-vis the hydraulic pressure, and the distance of piston 32 from end 39. Each incremental increase in hydraulic pressure to cylinder 31 will cause a correspondingly proportional incremental movement of piston 32 toward end 39. The spring also provides a quick and positive return of the piston when hydraulic pressure is decreased. Thus, a decrease in pressure to cylinder 31 will cause a correspondingly proportional incremental movement of piston 32 away from end 39.

The sping 34 of the braking cylinder assembly 20 and of the acceleration cylinder assembly 30 has a spring constant of approximately 100 lb/in and is preloaded to 75 pounds. Thus, referring to the acceleration cylinder assembly 30 (FIG. 3), the system at rest is characterized by the piston 32 resting all the way against end 36 with spring 34 in compression under an axial load of 75 pounds. The acceleration pedal would also be at its rest position. Thus, when the piston 32 is contacting the end 36, it takes 75 pounds of force to move it away from the end 36. This is so that the brake or acceleration pedal will not respond with a sudden jerk upon initial input of the joystick.

To adapt the hydraulic cylinders to a variety of vehicle pedal configurations, the hydraulic cylinder assembly 30 is pivotally connected to the vehicle at 42 and pivotally and slidably connected to the acceleration pedal at 43. An extension rod 46 is welded at one end to a ball 47 and is threadedly connected at its other end to piston rod 33 for longitudinal adjustment. A jam nut 91 is also threadedly received onto piston rod 33 between extension rod 46 and hydraulic cylinder 31. Jam nut 91 may be tightened against extension rod 46 when the desired position is reached between extension rod 46 and piston rod 33. A cup 84 is rigidly attached to acceleration pedal 27 by suitable means such as by welding. The cup 84 has walls 85 which extend hemicylindrically along extension rod 46, piston rod 33 and part of cylinder assembly 30 (FIGS. 2 and 3). Retaining piece 86 is rigidly attached to walls 85 and forms an oval loop surrounding the cylinder assembly 30. The retaining piece 86 permits one-dimensional pivotal movement of the cylinder assembly about the center of ball 47. The movement permitted to the cylinder assembly 30 is in the direction of arrow 87. Cylinder assembly 30 is thus received through retaining piece 86 with ball 47 resting in cup 84. The extension rod 46 and piston rod 33 are adjusted such that when the entire system is at rest, ball 47 rests adjacent to and within cup 84 with the force component between ball 47 and cup 84 along the direction of arrow 88 having a magnitude of zero. Both the acceleration pedal 27 and the brake pedal 26 have their own biasing means which return them from a depressed position to a rest position. Each such biasing means has a force component parallel to the central axis of its corresponding cylinder assembly as shown by arrow 88. In this manner, when hydraulic cylinder assembly 30 is actuated, force is transmitted through piston rod 33 and ball 47 to acceleration pedal via cup 84. The ball and socket relationship between ball 47 and cup 84 and the guidance of loop 86 permits cylinder assembly 30, which is pivotally attached to vehicle 10 at 42, to follow the natural movement of acceleration pedal 27. This configuration also permits the acceleration pedal to be depressed by the operator without pulling the piston down, too. That is, the cup 84, wall 85 and loop 86 slide telescopically with respect to assembly 30.

The braking cylinder assembly 20 is similarly attached to the brake pedal 26 and the vehicle 10.

Figure 4:
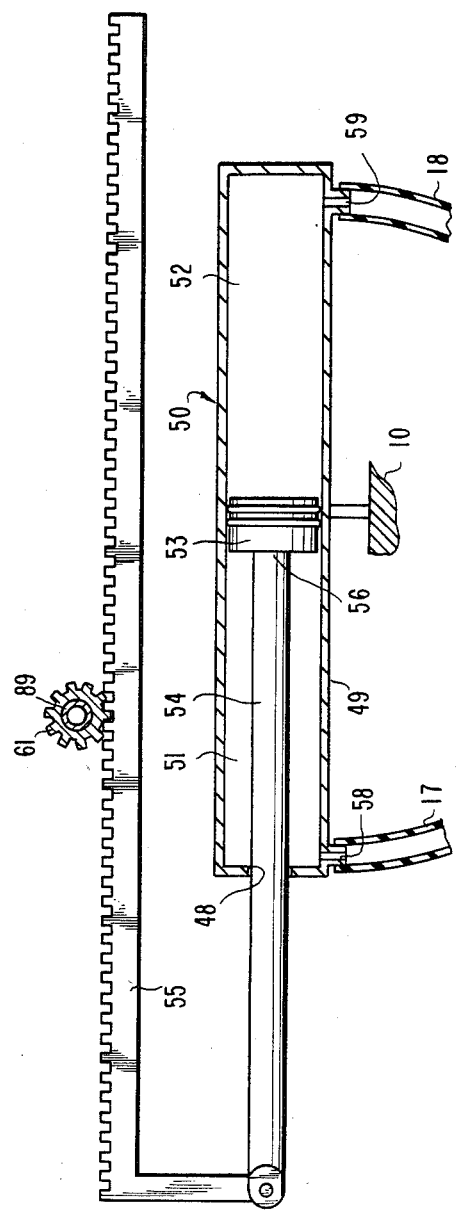
FIG. 4 is a detailed side section view of a hydraulic steering cylinder assembly in accordance with the present invention.

Joystick controlled power assist to the steering system of the vehicle is provided by a double port hydraulic steering cylinder assembly 50 (FIG. 4), having a cylinder 49 and two hydraulic chambers 51 and 52 separated by a reciprocating piston 53. The cylinder assembly 50 is rigidly mounted to the vehicle 10. A piston rod 54 is rigidly attached at one end 56 to piston 53 and extends outwardly through an aperture 48 in one end of the steering cylinder 49. Exteriorly of cylinder 49, piston rod 54 rigidly connects with a rack 55. The rack meshes with a pinion 61 which is coaxially connected to the steering column 89. In the preferred embodiment, the pinion 61 is telescopically slipped over the steering column 89 and then rigidly fixed to the steering column by appropriate means such as welding.

Apertures 58 and 59 of cylinder 49 connect hydraulic chambers 51 and 52, respectively, with hydraulic lines 17 and 18, respectively. An increase in hydraulic pressure through line 17 and aperture 58 into chamber 51 along with a corresponding decrease through line 18 and aperture 59 to chamber 52 will cause a change in the difference of pressure between chambers 51 and 52 resulting in movement of piston 53 away from aperture 48 thus drawing piston rod 54 through aperture 48 and further inside steering cylinder 49. This force and movement will be transferred directly to rack 55 which rotates the steering column 89. Conversely, an increase in pressure through line 18 and aperture 59 into chamber 52 with a corresponding decrease in pressure in chamber 51 will cause movement of the piston 53 toward aperture 48 which will again be transferred directly to rack 55.

Regulation of the amount of hydraulic pressure directed to the braking hydraulic cylinder assembly 20, the acceleration hydraulic cylinder assembly 30 and the double port hydraulic steering cylinder assembly 50 is achieved through a main control valve unit 70. The main control valve unit 70 houses two pressure control valves 71 and 72 and a double port pressure control valve 73. Control valves such as these are commercially available from Rexroth Corporation, Inc. and available through Hytech Fluid Power, Inc., 5121 East 65th Street, Indianapolis, Ind. 46220. The pressure control valves 71, 72 and 73 are governed by voltage variances from the joystick device 21. The type used in the preferred embodiment is a multiple access controller type "JS 1" commercially available from OEM Controls, Inc., 10 Controls Drive, Shelton, Conn. 06484. The joystick device 21 can be mounted to the left or right of the steering column of the vehicle depending on the needs of the particular driver.

The joystick device 21 translates incremental movement of the toggle 77 in all angular attitudes of displacement into four electrical output signals in the form of voltage variances. The four voltage variances correspond with the four coplanar displacement directions of the toggle along orthoganal X and Y axes from a neutral, straight-up position. For example, movement of the toggle 77 forward will produce a voltage variance in one of the four output lines contained in line 78 to the main control valve unit 70. Under normal operation, movement of the toggle 77 of joystick 21 forward will operate pressure control valve 71 allowing hydraulic fluid to pass from the input line 19, which has 400 psi available, to the braking hydraulic cylinder assembly 20. The output voltage range of the joystick device 21 is set from 5.5 volts when the toggle is straight up and down to approximately 14 volts. That is, when the toggle 77 is in a neutral straight up position, the output of the joystick device 21 is zero volts. When the toggle is moved incrementally in any direction, an output of 5.5 volts is produced corresponding to at least one of the four co-planar displacement directions. Further movement of toggle 77 corresponding to one of the four co-planar displacement directions will produce an increase in output voltage corresponding to that displacement direction. The amount of output voltage, between 5.5 volts and 14 volts, will vary in direct proportion with the distance of the toggle 77 from its neutral straight up position to its furthermost position in any one of the four co-planar displacement directions.

The preset value of 5.5 volts of the joystick device 21 corresponds directly with the 75 pound preload of the springs 34 in the hydraulic cylinder assemblies 20 and 30. The resulting system therefore operates as follows: the toggle 77 from a neutral upright position is moved incrementally forward producing a 5.5 volt output in one of the four output lines contained in line 78 which output line is connected to pressure control valve 71. The 5.5 volt input into pressure control valve 71 permits passage of an amount of hydraulic fluid through line 15 and causing exertion of hydraulic pressure in hydraulic braking cylinder assembly 20 and against piston 22. The amount of hydraulic pressure permitted to be exerted against piston 22 by the 5.5 voltage input to pressure control valve 71 exactly equals the 75 pound preload force exerted in the opposite direction against piston 22. Any increase in hydraulic pressure through line 15, and thus force against piston 22, will then overcome the spring force against piston 22 and will cause movement of piston 22. Therefore, any further forward incremental movement of toggle 77 will cause an incremental increase in voltage through line 78 to pressure control valve 71 permitting an increase in hydraulic fluid pressure through line 15 and will result in immediate movement of piston 22 and brake pedal 26. This arrangement precludes any lag between toggle movement and pedal response and produces a quick, accurate and smooth "feel" to the toggle movement.

Movement of the toggle back to the neutral or straight up position will close off the flow of hydraulic fluid from input line 19 and allow hydraulic fluid to escape the braking hydraulic cylinder assembly through the return line 23 thus allowing piston 22 to move all the way to the end 44 of the cylinder assembly 20 and pulling braking piston rod 28 away from brake pedal 26. The brake pedal 26 has its own biasing means which will cause the brake pedal to return to a neutral position. Movement of the toggle 77 of the joystick device 21 rearwardly will similarly operate the acceleration hydraulic cylinder assembly 30. With this configuration, the acceleration system and braking system may not be operated simultaneously. Movement of the toggle 77 to the left or to the right similarly governs the double port pressure control valve 73 which in turns regulates the amount of hydraulic fluid pressure to the hydraulic steering cylinder assembly 50 through lines 17 and 18 as described above.

A centering valve 60 is provided between hydraulic lines 17 and 18. When it is desired to drive the vehicle without the aid of the joystick vehicle controller, the centering valve 60 is engaged which opens the line permitting free passage of hydraulic fluid between lines 17 and 18 thus disengaging the hydraulic steering cylinder assembly 50 and permitting free movement of piston 53 and piston rod 54. Centering valves are commercially available from Waterman Hydraulics, 6565 West Howard Street, Chicago, Ill. 60648!-3397.

Pressure is supplied to the hydraulic cylinders by the engine pump 12 of the power steering system of the vehicle. Instead of tapping into the input line 64 to the power steering gearbox 11, a pressure regulator 80 is inserted between the return hose 81 and the power steering gearbox 11. The pressure regulator keeps a constant pressure at a feed point 82 located between the pressure regulator 80 and the power steering gearbox 11. The pressure maintained at feed point 82 is a constant 400 psi. This provides a constant 400 psi of pressure for the steering, braking and acceleration hydraulic cylinder assemblies 50, 20 and 30, respectively. This configuration also serves to provide a back pressure of 400 psi back pressure to the power steering gearbox. This 400 psi back pressure to the power steering system lessens the effect of the vehicle's power steering assistance by dropping the pressure available to the gearbox from approximately 1600 psi to approximately 1200 psi. The result is "stiffer" steering thus a less sensitive reaction for the joystick mechanism. This makes operation of the hydraulic/electrical joystick vehicle control device more responsive without causing oversteer.

For the safety and ease of use of the handicapped operator, this system is also equipped with a back up pump 13, oil cooler 14, oil filter 45, direction valves 68 and 69 and interconnecting hydraulic lines 67 and 68. When the electrical system of the vehicle is turned on without starting the engine, meter 66 sees zero pressure in the engine pump output line 65. Meter 66 then signals back up pump 13 to start which provides hydraulic pressure for operation of the hydraulic steering, braking and acceleration cylinders 50, 20 and 30, respectively, in addition to the vehicle's power steering system. The direction valves 68 and 69 maintain the direction of fluid flow as indicated by the arrows 75.

In the present embodiment where the voltage range of the joystick device 21 is set up to 14 volts, an auxiliary battery is used (not shown) which is capable of providing the increased voltage. It also supplies power to the back-up pump.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A joystick vehicle control device operable to control the brake pedal or acceleration pedal of a vehicle, comprising:
   a source of hydraulic pressure:
   a hydraulic cylinder assembly capable of receiving hydraulic pressure;
   hand operable input means capable of varying the amount of hydraulic pressure from said source to said hydraulic cylinder assembly;
   said hydraulic cylinder assembly mounted between said vehicle and one of said brake pedal and said acceleration pedal, said hydraulic cylinder assembly comprising:
   a hydraulic cylinder,
   a reciprocating piston received within said hydraulic cylinder and slidably responsive to the amount of said hydraulic pressure received by said hydraulic cylinder assembly,
   a piston rod connected to and reciprocating with said piston, said piston rod extending externally of said hydraulic cylinder assembly, and
   a spring for defining the position of the piston and piston rod within said hydraulic cylinder relative to the amount of said hydraulic pressure received by said hydraulic cylinder assembly, said spring being mounted between said piston and said hydraulic cylinder and biasing said piston against the force of said hydraulic pressure upon said piston;
   wherein said hydraulic cylinder assembly includes a pair of mounting means for mounting said assembly between said vehicle and one of said brake pedal and said acceleration pedal, one of said pair of mounting means being attached to said hydraulic cylinder and the other of said pair of mounting means being attached to the piston rod external to said hydraulic cylinder assembly;
   wherein said source of hydraulic pressure includes a pressure regulator for maintaining a constant feed pressure available to said hydraulic cylinder assembly;
   wherein said hand operable input means includes a pressure control valve for regulating the amount of pressure fed to said hydraulic cylinder assembly from said feed pressure; and,
   wherein said vehicle includes a power steering system having a power steering gearbox and a return hose leading from said gearbox, and wherein said pressure regulator operates between the gearbox and the return hose of said vehicle to produce said constant feed pressure at a feed point between the gearbox and the regulator.

2. The joystick vehicle control device of claim 1 wherein said constant feed pressure is 400 psi.

3. The joystick vehicle control device of claim 1 wherein said control valve operates between said feed point and said hydraulic cylinder assembly.

4. The joystick vehicle control device of claim 3 wherein said hand operable input means further includes a hand operable joystick device, said pressure control valve being responsive to said joystick.

5. The joystick vehicle control device of claim 1 wherein said spring is preloaded to 75 lbs.

6. The joystick vehicle control device of claim 5 wherein said spring operates in compression.

7. A joystick vehicle control device operable to control the brake pedal or acceleration pedal of a vehicle, comprising:
   a source of hydraulic pressure;
   a hydraulic cylinder assembly capable of receiving hydraulic pressure;
   hand operable input means capable of varying the amount of hydraulic pressure from said source to said hydraulic cylinder assembly;
   said hydraulic cylinder assembly mounted between said vehicle and one of said brake pedal and said acceleration pedal, said hydraulic cylinder assembly comprising:
   a hydraulic cylinder,
   a reciprocating piston received within said hydraulic cylinder and slidably responsive to the amount of said hydraulic pressure received by said hydraulic cylinder assembly,
   a piston rod connected to and reciprocating with said piston, said piston rod extending externally of said hydraulic cylinder assembly, and
   a spring for defining the position of the piston and piston rod within said hydraulic cylinder relative to the amount of said hydraulic pressure received by said hydraulic cylinder assembly, said spring being mounted between said piston and said hydraulic cylinder and biasing said piston against the force of said hydraulic pressure upon said piston;

wherein said hydraulic cylinder assembly includes a pair of mounting means for mounting said assembly between said vehicle and one of said brake pedal and said acceleration pedal, one of said pair of mounting means being attached to said hydraulic cylinder and the other of said pair of mounting means being attached to the piston rod external to said hydraulic cylinder assembly; and, wherein the other of said pair of mounting means includes a longitudinally adjustable extension rod having a ball rigidly connected thereto distal of said piston rod and further includes a cup rigidly attached to one of said brake pedal and said acceleration pedal, said cup being shaped to accept the ball of said extension rod in a ball and socket relationship, said cup having walls extending hemicylindrically along said extension rod, said piston rod and part of said hydraulic cylinder, said walls having an oval loop located distal of said ball and surrounding said hydraulic cylinder, said loop permitting partial transverse movement of said hydraulic cylinder assembly within said loop.

8. A joystick vehicle controller to operate the braking, acceleration and steering systems of a vehicle, comprising:

a source of hydraulic pressure providing a constant feed pressure;

first and second hydraulic cylinder assemblies mounted to said vehicle and capable of receiving hydraulic pressure;

hand operable input means capable of varying the amount of hydraulic pressure from said source to each of said hydraulic cylinder assemblies;

each of said hydraulic cylinder assembly comprising:
a hydraulic cylinder having a first mounting means,
a reciprocating piston received within said hydraulic cylinder and slidably responsive to the amount of said hydraulic pressure received by said hydraulic cylinder assembly,
a piston rod connected to and reciprocating with said piston, said piston rod extending externally of said hydraulic cylinder assembly and having thereon a second mounting means, and
a spring for defining the position of the piston and piston rod relative to the amount of said hydraulic pressure received by said hydraulic cylinder assembly, said spring biasing said piston against the force of said hydraulic pressure upon said piston;

said first hydraulic cylinder assembly being mounted by said first and second mounting means between said vehicle and said braking system to operate said braking system;

said second hydraulic cylinder assembly being mounted by said first and second mounting means between said vehicle and said acceleration system to operate said acceleration system;

a hydraulic steering cylinder assembly mounted to said vehicle and capable of receiving hydraulic pressure;

said hand operable input means capable of varying the amount of hydraulic pressure from said source to said hydraulic steering cylinder assembly;

said steering cylinder assembly comprising:
a hydraulic steering cylinder having a third mounting means,
a reciprocating steering piston received within said steering cylinder,
said steering cylinder having two oppositely disposed hydraulic chambers divided by said steering piston, each chamber having a hydraulic inlet capable of receiving hydraulic pressure,
said steering piston being slidably responsive to changes in the difference of hydraulic pressure between the hydraulic chambers of said steering cylinder,
a steering piston rod connected to and reciprocating with said steering piston, said steering piston rod extending externally of said steering cylinder assembly and having thereon a fourth mounting means;

said steering cylinder assembly being mounted by said third and fourth mounting means between said vehicle and said steering system to operate said steering system; and, wherein said hand operable input means includes a main control valve unit, said main control valve unit comprising:
a first pressure control valve for regulating the amount of pressure fed to said first hydraulic cylinder assembly from said feed pressure,
a second pressure control valve for regulating the amount of pressure fed to said second hydraulic cylinder assembly from said feed pressure, and
a double port pressure control valve for regulating the amount of pressure fed to the hydraulic chambers of said hydraulic steering cylinder assembly from said feed pressure.

9. The joystick vehicle controller of claim 8 wherein said source of hydraulic pressure includes a pressure regulator for maintaining a constant feed pressure available to said first and second hydraulic cylinder assemblies and to said hydraulic steering cylinder assemblies.

10. The joystick vehicle controller of claim 9 wherein said constant feed pressure is 400 psi.

11. A joystick vehicle controller to operate the braking, acceleration and steering systems of a vehicle, comprising:

a source of hydraulic pressure;

first and second hydraulic cylinder assemblies mounted to said vehicle and capable of receiving hydraulic pressure;

hand operable input means capable of varying the amount of hydraulic pressure from said source to each of said hydraulic cylinder assemblies;

each of said hydraulic cylinder assembly comprising:
a hydraulic cylinder having a first mounting means,
a reciprocating piston received within said hydraulic cylinder and slidably responsive to the amount of said hydraulic pressure received by said hydraulic cylinder assembly,
a piston rod connected to and reciprocating with said piston, said piston rod extending externally of said hydraulic cylinder assembly and having thereon a second mounting means, and
a spring for defining the position of the piston and piston rod relative to the amount of said hydraulic pressure received by said hydraulic cylinder assembly, said spring biasing said piston against the force of said hydraulic pressure upon said piston;

said first hydraulic cylinder assembly being mounted by said first and second mounting means between said vehicle and said braking system to operate said braking system;

said second hydraulic cylinder assmebly being mounted by said first and second mounting means between said vehicle and said acceleration system to operate said acceleration system;

a hydraulic steering cylinder assembly mounted to said vehicle and capable of receiving hydraulic pressure;

said hand operable input means capable of varying the amount of hydraulic pressure from said source to said hydraulic steering cylinder assembly;

said steering cylinder comprising:
 a hydraulic steering cylinder having a third mounting means,
 a reciprocating steering piston received within said steering cylinder,
 said steering cylinder having two oppositely disposed hydraulic chambers divided by said steering piston, each chamber having a hydraulic inlet capable of receiving hydraulic pressure,
 said steering piston being slidably responsive to changes in the difference of hydraulic pressure between the hydraulic chambers of said steering cylinder,
 a steering piston rod connected to and reciprocating with said steering piston, said steering piston rod extending externally of said steering cylinder assembly and having thereon a fourth mounting means;

said steering cylinder assembly being mounted by said third and fourth mounting means between said vehicle and said steering system to operate said steering system; and wherein said source of hydraulic pressure includes a pressure regulator for maintaining a constant feed pressure;

wherein said vehicle includes a power steering system having a power steering gearbox and a return hose leading from said gearbox, and wherein said source of hydraulic pressure includes a pressure regulator operating between the gearbox and the return hose of said vehicle to produce a constant feed pressure at a feed point between the gearbox and the regulator available to said first and second hydraulic cylinder assemblies and to said hydraulic steering cylinder assembly.

12. The joystick vehicle controller of claim 8 wherein said main control valve unit operates between said feed point and said first and second hydraulic cylinder assemblies and said hydraulic cylinder assembly.

13. The joystick vehicle control device of claim 11 wherein said hand operable input means further includes a hand operable joystick device, said main control valve unit being responsive to said joystick.

14. The joystick vehicle control device of claim 7 wherein the spring of said first hydraulic cylinder and of said second hydraulic cylinder is preloaded to 75 lbs.

15. The joystick vehicle control device of claim 13 wherein the spring of said first hydraulic cylinder and of said second hydraulic cylinder operates in compression.

16. A joystick vehicle control device operable to control the brake pedal, the acceleration pedal and the steering system of a vehicle, the steering system including a power steering gearbox and a return hose leading from said gearbox, the control device comprising:
 a hydraulic pressure source:
 first, second and third hydraulic cylinder assemblies, each connected to said pressure source and each including a cylinder mounted to the vehicle, a piston within the cylinder, a piston rod connected at one end to the piston and connected at a second end exteriorly of the cylinder to one of said brake pedal, said acceleration pedal and said steering system, the piston being slidably responsive to changes in hydraulic pressure from said hydraulic pressure source:
 wherein said hydraulic pressure source includes a pressure regulator operating at a feed point between the gearbox and the return hose for providing a constant feed pressure to each of said hydraulic cylinder assemblies: and,
 hand operable input means for varying the amount of hydraulic pressure from said hydraulic pressure source the feed point to each cylinder.

17. The joystick vehicle control device of claim 16 wherein said hand operable input means includes a plurality of pressure control valves for regulating the amount of pressure fed to said hydraulic cylinder assemblies.

18. The joystick vehicle control device of claim 17 wherein said hand operable input means further includes a hand operable joystick device, said pressure control valves being responsive to said joystick.

19. The joystick vehicle control device of claim 16 wherein said constant feed pressure is 400 psi.

20. The joystick vehicle control device of claim 16 wherein each of said hydraulic cylinder assemblies includes a spring biasing the piston against hydraulic pressure acting on the piston.

21. The joystick vehicle control device of claim 17 wherein the cylinder of said third hydraulic cylinder assembly is a steering cylinder and has two oppositely disposed pressure chambers divided by a steering piston which is slidable responsive to changes in the difference of hydraulic pressure within the chambers, and wherein the piston rod of said third hydraulic cylinder is connected at one end to the steering piston and at its other end exteriorly of the steering cylinder to a rack, the rack meshing with a pinion which is rigidly and coaxially connected to the steering system of the vehicle to operate the steering system.

22. The joystick vehicle control device of claim 21 wherein said plurality of pressure control valves include:
 a first pressure control valve for regulating the amount of pressure fed to said first hydraulic cylinder assembly from said feed pressure.
 a second pressure control valve for regulating the amount of pressure fed to said second hydraulic cylinder assembly from said feed pressure, and
 a double port pressure control valve for regulating the amount of pressure fed to each hydraulic pressure chamber of the steering cylinder from said feed pressure.

23. The joystick vehicle control device of claim 21 further including a centering valve connected between the pressure chambers for disabling the third hydraulic cylinder assembly.

24. A joystick vehicle control device for operating the brake pedal, acceleration pedal and steering system of a vehicle, the steering system including a source of hydraulic pressure, comprising:
 a pressure regulator for maintaining a constant feed pressure from the source of hydraulic pressure:

first and second hydraulic cylinder assemblies connected to and operating the brake pedal and the acceleration pedal:

a third hydraulic cylinder assembly including a steering cylinder having a pair of opposing pressure chambers divided by a piston which is slidably responsive to changes in the difference in pressure between the opposing pressure chambers, the piston being integrally connected to and operating the steering system; and, hand operable input means including first and second pressure control valves for regulating the amount of pressure fed to said first and second cylinder assemblies from the constant feed pressure and including a double port pressure control valve for regulating the ratio of pressure fed to each of the opposing pressure chambers from the feed pressure.

25. A joystick vehicle control device for controlling the steering system of a vehicle, the steering system including a source of hydraulic pressure, a power steering gearbox and a return hose leading from said gearbox, comprising:

a hydraulic steering cylinder assembly connected to the steering system:

a pressure regulator operating between the gearbox and the return hose and producing a constant feed pressure at a feed point between the gearbox and the regulator; and, hand operable input means for controlling the amount of pressure fed to said hydraulic steering cylinder assembly from the feed point.

26. The joystick vehicle control device of claim 25 wherein said hydraulic steering cylinder assembly includes a steering cylinder having a pair of opposing pressure chambers divided by a piston which is slidably responsive to changes in the difference in pressure between the opposing pressure chambers, the piston being integrally connected to and operating the steering system.

27. The joystick vehicle control device of claim 26 wherein said hand operable input means includes a double port pressure control valve for regulating the ratio of pressure fed to each of the opposing pressure chambers.

* * * * *

UNITED STATES PATENT AND TRADEMARK OFFICE
CERTIFICATE OF CORRECTION

PATENT NO. : 4,722,416

DATED : February 2, 1988

INVENTOR(S) : Bruce L. Ahnafield

It is certified that error appears in the above-identified patent and that said Letters Patent is hereby corrected as shown below:

In block 56 on the title page, under Attorney, Agent, or Firm, please change "McNeit" to --McNett--.
In column 3, line 50, please change "bodyp's" to --body's--.
In column 6, line 63, please delete "!" after --60648--.
In column 7, line 48, please change ":" to --;--.
In column 11, line 3, please change "assmebly" to --assembly--.
In column 11, line 68, please change ":" to --;--.
In column 12, line 10, please change ":" to --;--.
In column 12, line 15, please change ":" to --;--.
In column 12, line 51, please change "." to --,--.
In column 12, line 68, please change ":" to --;--.
In column 13, line 3, please change ":" to --;--.
In column 13, line 23, please change "." to --,--.
In column 14, line 2, please change ":" to --;--.

Signed and Sealed this

Thirtieth Day of August, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,722,416

DATED : February 2, 1988

INVENTOR(S) : Bruce L. Ahnafield

It is certified that error appears in the above-identified patent and that said Letters Patent is hereby corrected as shown below:

In column 12, line 18, after "source" and before "the", please insert --and--.

Signed and Sealed this

Twenty-fourth Day of April, 1990

Attest:

HARRY F. MANBECK, JR.

*Attesting Officer*  *Commissioner of Patents and Trademarks*